Oct. 22, 1935.  C. MORROW  2,018,462

FREEZING APPARATUS

Filed May 12, 1934  2 Sheets-Sheet 1

INVENTOR
Clifford Morrow
BY
ATTORNEY

Oct. 22, 1935.  C. MORROW  2,018,462

FREEZING APPARATUS

Filed May 12, 1934   2 Sheets-Sheet 2

INVENTOR
Clifford Morrow
BY
ATTORNEY

Patented Oct. 22, 1935

2,018,462

UNITED STATES PATENT OFFICE 2,018,462

FREEZING APPPARATUS

Clifford Morrow, Canton, Ohio, assignor to The H. H. Miller Industries Company, Canton, Ohio, a corporation of Ohio Application May 12, 1934, Serial No. 725,375

12 Claims. (Cl. 62—114)

This invention relates to a freezing or cooling apparatus, more particularly to an improved mechanism for lowering the temperature of a refrigerant (such as brine) adapted to be circulated to and through a heat exchange device having walls with which the material to be cooled or frozen contacts, for example, a surface cooler for milk, a tubular cooler or a freezer for cream, ices and the like, the latter type of construction being chosen for illustration.

In plants for making and storing frozen products (ice cream and the like) and cooling and storing milk it has been the practice to provide a large reservoir for brine which was circulated to and through storage rooms and to the freezers or other devices during the day's run for freezing or cooling. This arrangement necessitated the installation of a refrigeration system and a brine reservoir of larger capacity than was required for refrigerating the storage rooms and piping to and from the freezers or other heat exchange devices, so that when the latter were in operation, an adequate supply of brine was available. Also, where a plant was equipped with brine refrigerated freezers and other heat exchange devices and it was desired to change over the refrigerating system, it necessitated replacing this equipment at great expense. To overcome these conditions, I have provided a refrigerating mechanism for brine which is independent of the brine supply or other refrigerating system for the storage rooms and connected directly to the freezer or other device whereby the latter may be operated at will economically and independently of other refrigerating means or systems in a plant and an adequate supply of brine may be quickly provided.

Furthermore, as it is desirable to use for freezing operations brine at a lower temperature than that of the brine used for storage rooms, the herein disclosed mechanism insures economical operation as the brine required can be refrigerated in a very short time and does not require the expenditure of power to lower the temperature of the large quantity of brine used for storage rooms or the entire system in a plant.

One object of the invention is to provide an improved refrigerating mechanism of relatively simple and compact construction and having large capacity.

Another object of the invention is to provide an improved refrigerating mechanism which may be readily installed.

Another object of the invention is to provide an improved refrigerating mechanism adapted to quickly supply a refrigerant for cooling or freezing operations, whereby the latter may be effected expeditiously and economically.

Other objects of the invention will be apparent to those skilled in the art to which my invention relates from the following description taken in connection with the accompanying drawings, wherein Fig. 1 is an elevation of a freezing apparatus having a refrigerating mechanism embodying my invention.

Figure 1:
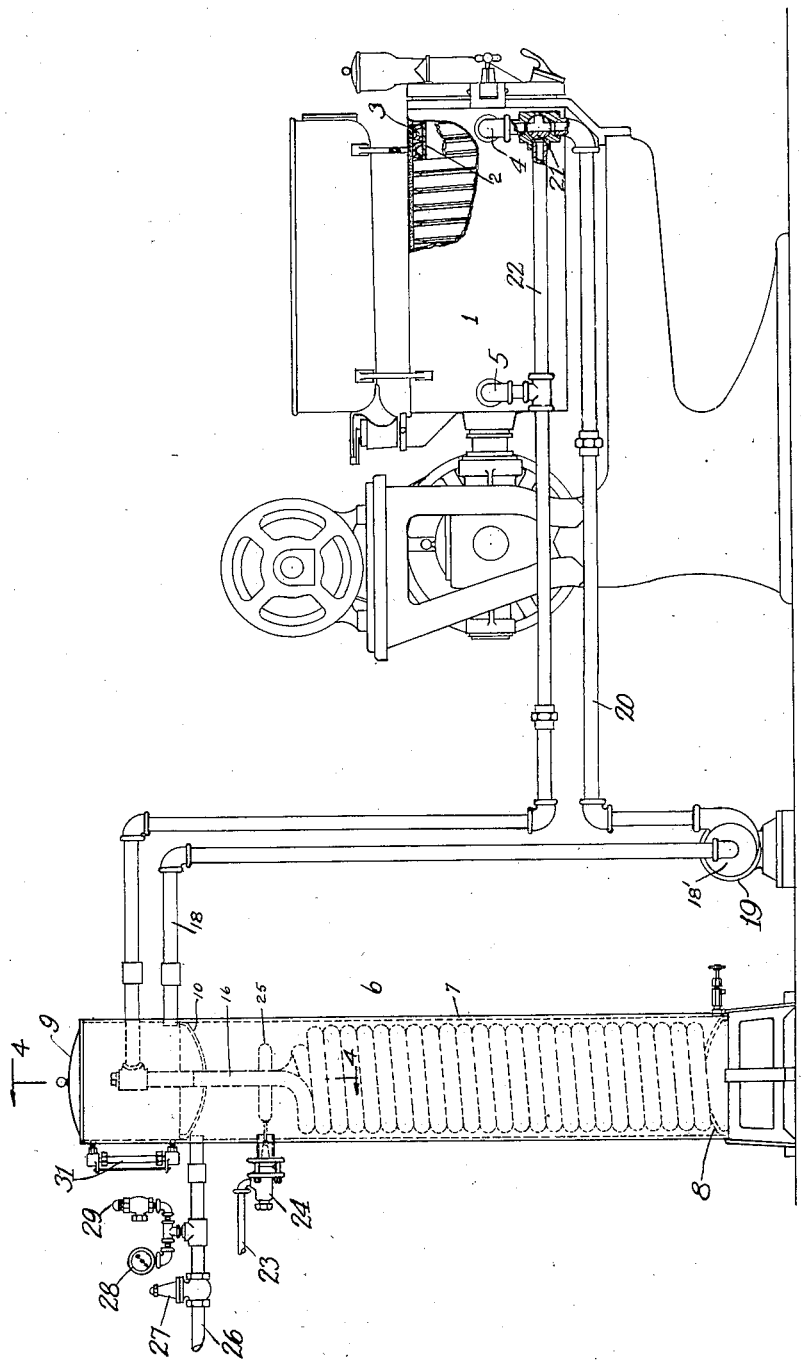
Figure 3:
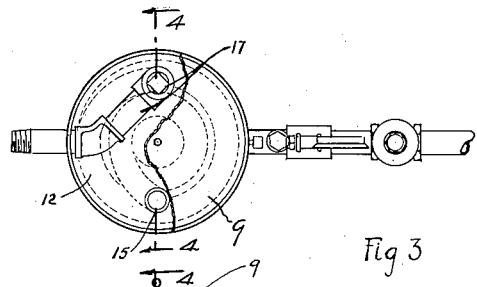
Fig. 3 is a plan view of parts shown in Fig. 2.
Figure 4:
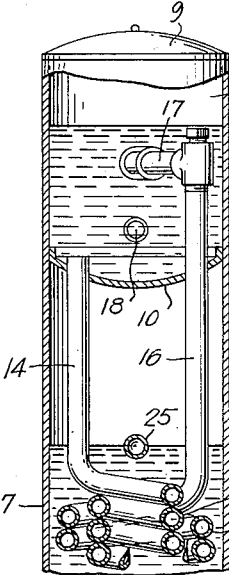
Fig. 4 is a fragmentary section on the line 4—4 of Figs. 1, 2 and 3, looking in the directions indicated by arrows.
Figure 2:
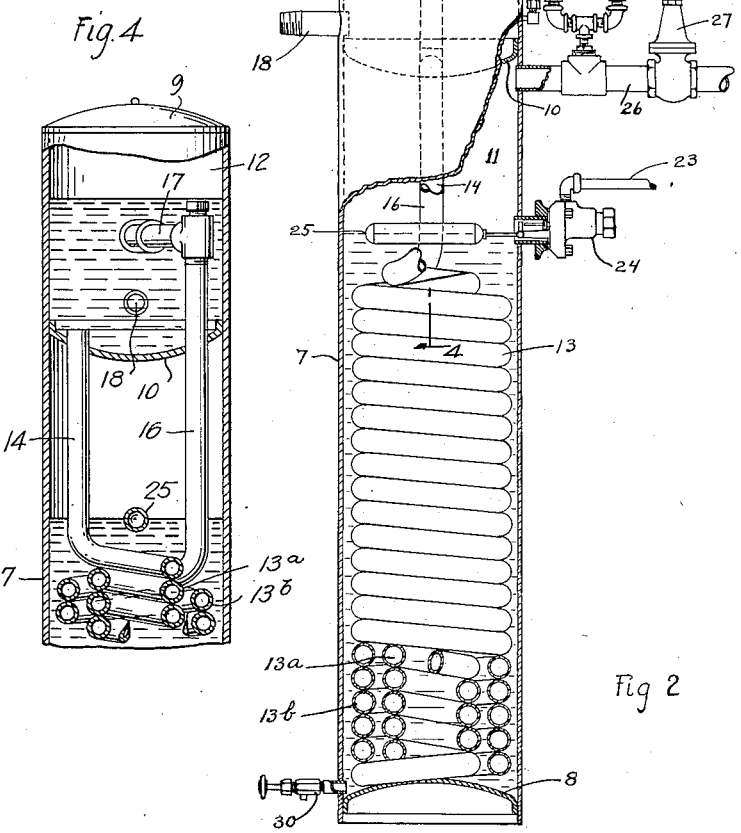
Fig. 2 is a section.

In the drawings, 1 indicates as an entirety a freezer of suitable construction, preferably similar to that shown in Letters Patent No. 1,692,964 granted Nov. 27, 1928 to William H. Thompson and comprising an inner material freezing cylinder 2 containing the power driven agitating mechanism and a surrounding circuitous passage 3 for brine, which is supplied by a pipe 4 and discharged by a pipe 5.

6 indicates as an entirety a refrigerating mechanism comprising the following: 7 indicates a container having a bottom 8, preferably of convex shape, a top 9 and an intermediate transverse wall 10, preferably of concave shape, dividing the cylinder into a lower chamber 11 adapted to contain a predetermined quantity of liquid volatile refrigerant, such as liquid ammonia and an upper chamber 12 forming part of a circulation system and an overflow chamber 35 for a refrigerated medium, such as brine. The shape and arrangement of the bottom 8 and wall 10 provide against undue pressure in the chamber 11. The bottom 8, top 9 and wall 10 are preferably welded to the inner surface of the container wall to insure liquid and gas tight joints. The container wall, bottom, and wall 10 are formed of metal capable of resisting internal pressure. 13 indicates a circuitous shaped conduit for brine mounted in the chamber 11 in spaced relation to its walls. The conduit 13 preferably consists of two coils 13a, 13b, one within and spaced from the other coil, their lower convolutions being connected so as to form one continuous conduit. In this arrangement of the brine coils, sufficient turbulence in the brine is effected to bring all portions thereof into contact with the walls of the coils to insure rapid and maximum heat transfer. The upper convolution of the inner coil 13a is provided with an extension pipe 14 which leads through and is connected in a gas and liquid tight manner to the walls of an opening 15 formed in the wall 10, to discharge the brine into the chamber 12. The upper convolution of the outer coil 13b is provided with an extension pipe 16 which by preference leads through the wall 10 into the chamber 12. The upper end of the pipe 16 is connected by an L-member to a pipe 17. The other end of the pipe 17 is connected to the outlet end of the circuitous passage 3, as shown in Fig. 1. As the container 7 is by preference of cylindrical shape, the coils are of similar shape and arranged in concentric spaced relation to each other and the container wall 7 for a purpose later set forth. 18 indicates a pipe leading from the chamber 12 and connected to the intake of a suitable pump 18' driven by a motor 19. The discharge outlet of the pump 18' is connected by a pipe 20 to the inlet for the passage 3, the supply of brine thereto being controlled by a valve 21. 22 indicates a section of pipe leading from the valve 21 to the pipe 17 so that when the valve 21 is closed the brine circulation will be diverted through the pipe 22 for return to the coils in the chamber 11 and kept in circulation ready for use, the valve 21 being of the two way type so that the brine will be supplied either to the inlet for the passage 3 or to the pipe 22. 23 indicates a pipe for supplying liquid ammonia to the chamber 11. The pipe 23 is connected to a casing 24 containing a suitable valve, the valve element of which is controlled by a float 25, so that when the ammonia level drops, the valve opens to admit ammonia from the pipe 23. The valve casing 24 is secured in a gas and liquid tight manner in an opening formed in the container wall in such position that the float will maintain the level of the liquid ammonia above the coils 13a, 13b, so that they will be submerged therein at all times. 26 indicates an outlet pipe for gas leading to the suction side of a suitable compressor. 27 indicates a back pressure valve mounted in the pipe 26. The pipe 26 leads from the upper end of the chamber 11. 28 indicates a pressure gage and 29 indicates a safety valve. 30 indicates a valved drain for any oil which may accumulate in the ammonia from time to time.

The top 9 is removable so as to provide for the supply of brine to the system.

The pipes 17 and 18 may be provided with suitable cut-offs. The portions of these pipes which extend through the wall of the container 7 may be secured in suitable openings therein and exteriorly of the container, these portions are detachably connected to the remaining portions of the pipes. The lowermost convolution of the coil 13b rests upon the bottom 8 and as the latter is convex it serves to center the coils in the container 7. The upper ends of the coils are held centrally of the container by the connection of the extension pipes 14 and 16 to the wall 10. As these pipes are arranged in spaced relation, their connections with the wall 10 serve to hold the coils 13a, 13b, against twisting during shipment. This spacing of the pipes 14 and 16 also provides ample space for the float 25. 31 indicates a suitable gage for the brine mounted exteriorly of the container 7.

In operation, the chamber 11 is filled with liquid ammonia up to the level controlled by the float 25 and the circulation system is filled with brine up to a predetermined level as indicated by the gage 31. If it is desired to freeze cream or an ice in the freezer 1, the valve 21 is set to shunt the brine through the return section 22 and then the pump 18' is set in operation, the effect of which is to circulate the brine through the coils 13a, 13b. This circulation is continued. When by the absorption of heat from the brine its temperature is lowered to the desired degree, for example —10° F., the brine may be admitted to the passage 3 and the freezing operations carried out. When these operations are completed, the pump 18' may be stopped.

In the herein disclosed construction and arrangement, the conduit is formed of concentrically related coils connected in series so that the brine flows through a long conduit and by the provision of a container slightly larger than the outer coil, a relatively small quantity of the volatile refrigerant is required to submerge all portions of the conduit therein.

As a result the brine may be quickly lowered in temperature, a relatively small quantity of brine is required for the system and a small overflow chamber only for the brine is needed.

It will also be noted that the refrigerant and overflow chambers may be conveniently associated within a single cylindrical member, which facilitates manufacture of the mechanism and provides for ready insulation of all exposed walls; also, the over-flow chamber (a) is so related to the heat exchange device 1 that in the event of flow of the refrigerated fluid or brine, due to gravitation thereof, the level of the fluid in this chamber will be below its top wall and (b) permits of varying quantities of the fluid to be maintained in the system.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. In apparatus of the class described, the combination with a heat exchange device, of a container provided with an intermediate wall forming a chamber for a liquid volatile refrigerant and a chamber for a refrigerated fluid, and a circulation system for the fluid connected to said device, said system comprising a pipe leading from said fluid chamber to said device, a pipe leading from said device into said fluid chamber, a circuitous conduit connected at one end to said last mentioned pipe and submerged in the volatile refrigerant in said chamber therefor and connected at its opposite end to said fluid chamber through said intermediate wall for discharging the fluid into said fluid chamber, and means in one of said pipes for inducing a flow of the fluid through said system.

2. In apparatus of the class described, the combination with a heat exchange device, of a container provided with an intermediate wall forming a chamber for a liquid volatile refrigerant and a chamber for a refrigerated fluid, and a circulation system for the fluid connected to said device, said system comprising a supply pipe leading from said fluid chamber to said device, a return pipe leading from said device into said fluid chamber, a circuitous conduit connected at one end to said last mentioned pipe and submerged in the volatile refrigerant in said chamber therefor and connected at its opposite end to said fluid chamber through said intermediate wall for discharging the fluid into said fluid chamber, and means in said supply pipe for inducing a flow of the fluid through said system.

3. In apparatus of the class described, the combination with a heat exchange device, of a container provided with an intermediate wall forming a liquid volatile refrigerant holding chamber having an outlet opening and a chamber for a refrigerated fluid, a circulation system for the fluid connected to said device, said system comprising a pipe leading from said fluid chamber to said device, a pipe leading from said device into said fluid chamber, a circuitous conduit connected at one end to said last mentioned pipe and submerged in the volatile refrigerant in said chamber therefor and connected at its opposite end to said fluid chamber through said intermediate wall for discharging the fluid into said fluid chamber, means in one of said pipes for inducing a flow of the fluid through said system, and a supply means connected to said refrigerant chamber for the liquid volatile refrigerant including a valve and a float for controlling the valve to maintain a predetermined quantity of the refrigerant in said chamber.

4. In apparatus of the class described, a container having an intermediate wall forming a lower chamber adapted to hold a substantially predetermined quantity of liquid volatile refrigerant and an upper chamber adapted to receive and permit over-flow of a refrigerated fluid, a pipe leading from said upper chamber and adapted to be connected to a heat exchange device, a coil within said lower chamber, a pipe adapted to be connected to the heat exchange device and leading through the wall of said container and connected to the inlet end of said coil, the opposite end of said coil being connected to said upper chamber, the wall of said container at the upper end of said lower chamber being formed with an outlet for gas, and a supply means leading to said lower chamber for supplying refrigerant thereto.

5. In apparatus of the class described, a container having an intermediate wall forming a lower chamber adapted to hold a substantially predetermined quantity of liquid volatile refrigerant and an upper chamber adapted to receive and permit over-flow of a refrigerated fluid, a pipe leading from said upper chamber and adapted to be connected to a heat exchange device, series connected coils within said lower chamber, a pipe adapted to be connected to the heat exchange device and leading through the wall of said container and connected to the inlet end of said coils, the opposite end of said coils being connected to said upper chamber, the wall of said container at the upper end of said lower chamber being formed with an outlet for gas, and a supply means leading to said lower chamber for supplying refrigerant thereto.

6. In apparatus of the class described, a container having an intermediate wall forming a lower chamber adapted to hold a substantially predetermined quantity of liquid volatile refrigerant and an upper chamber adapted to receive and permit over-flow of a refrigerated fluid, a pipe leading from said upper chamber and adapted to be connected to a heat exchange device, a conduit within said lower chamber and comprising series connected concentric coils in spaced relation to each other and the walls of said chamber, a pipe adapted to be connected to the heat exchange device and leading through the wall of said container and connected to the inlet end of said coil, the opposite end of said coil being connected to said upper chamber, the wall of said container at the upper end of said lower chamber being formed with an outlet for gas, and a supply means leading to said lower chamber for supplying refrigerant thereto.

7. In apparatus of the class described, a container having an intermediate wall forming a lower chamber adapted to hold a substantially predetermined quantity of liquid volatile refrigerant and an upper chamber adapted to receive and permit over-flow of a refrigerated fluid, a pipe leading from said upper chamber and adapted to be connected to a heat exchange device, a coil within said lower chamber, the ends of said coil having extension pipes connected to said intermediate wall in spaced relation, one of said pipes being arranged to discharge fluid into said upper chamber, a pipe adapted to lead from the heat exchange device and connected to the other extension pipe, the wall of said container at the upper end of said lower chamber being formed with an outlet for gas, and a supply means leading to said lower chamber for supplying refrigerant thereto.

8. In apparatus of the class described, a container having convexed shaped bottom and provided with an intermediate wall forming a lower chamber adapted to hold a substantially predetermined quantity of liquid volatile refrigerant and an upper chamber adapted to receive and permit over-flow of a refrigerated fluid, a pipe leading from said upper chamber and adapted to be connected to a heat exchange device, a coil mounted centrally on said bottom, the ends of said coil having extension pipes connected to said intermediate wall in spaced relation and co-operating with said bottom to support the coil in said lower chamber, one of said pipes being arranged to discharge fluid into said upper chamber, a pipe adapted to lead from the heat exchange device and connected to the other extension pipe, the wall of said container at the upper end of said lower chamber being formed with an outlet for gas, and a supply means leading to said lower chamber for supplying refrigerant thereto.

9. In apparatus of the class described, a container having an intermediate wall forming a lower chamber adapted to hold a substantially predetermined quantity of liquid volatile refrigerant and an upper chamber adapted to receive and permit over-flow of a refrigerated fluid, a pipe leading from said upper chamber and adapted to be connected to a heat exchange device, a coil mounted centrally on said bottom, the ends of said coil having spaced extension pipes connected to said intermediate wall and co-operating with said bottom to support the coil in said lower chamber, one of said pipes being arranged to discharge fluid into said upper chamber, a pipe adapted to lead from the heat exchange device and connected to the other extension pipe, the wall of said container at the upper end of said lower chamber being formed with an outlet for gas, and a supply means leading to said lower chamber for supplying refrigerant thereto, said means including a valve and a float operable in the space between said extension pipes for controlling said valve.

10. In apparatus of the class described, the combination with a heat exchange device, of a chamber adapted to hold a substantially predetermined quantity of volatile liquid refrigerant and formed in its upper portion with an outlet for gas, a system for circulating a refrigerated fluid to said device, said system comprising a chamber adapted to receive the refrigerated fluid, a pipe leading from said fluid chamber and connected to said heat exchange device, a circuitous conduit within said refrigerant chamber, a pipe leading from said heat exchange device and connected to the inlet end of said conduit, the opposite end of said conduit being connected to said fluid chamber, and means for supplying refrigerant to said refrigerant chamber.

11. In apparatus of the class described, the combination with a heat exchange device, of a chamber adapted to hold a substantially predetermined quantity of volatile liquid refrigerant and formed in its upper portion with an outlet for gas, a system for circulating a refrigerated fluid to said device, said system comprising a chamber adapted to receive the refrigerated fluid and supported relative to said device so that the flow of the fluid in the system due to gravitation will not fill said fluid chamber, a pipe leading from said fluid chamber and connected to said heat exchange device, a circuitous conduit within said refrigerant chamber, a pipe leading from said heat exchange device and connected to the inlet end of said conduit, the opposite end of said conduit being connected to said fluid chamber, and means for supplying refrigerant to said refrigerant chamber.

12. In apparatus of the class described, the combination with a heat exchange device, of a casing forming a chamber for a volatile liquid refrigerant and an over-flow chamber for a refrigerated fluid arranged in elevated relation to said device, a system for circulating the fluid to said device, said system comprising a supply pipe leading from said fluid chamber to said device, a return pipe leading from said device, a circuitous conduit connected at one end to said last mentioned pipe and submerged in the volatile refrigerant in said chamber therefor and connected at its opposite end to said fluid chamber for discharging the fluid thereinto, said refrigerant chamber being formed with an outlet for gas, and means in one of said pipes for inducing a flow of the fluid through said system.

CLIFFORD MORROW.